United States Patent Office 2,955,115
Patented Oct. 4, 1960

2,955,115

LONG-CHAIN FATTY ACID ESTERS OF VITAMIN B$_6$

Fred A. Kummerow and Taketami Sakuragi, both of Urbana, Ill.

No Drawing. Filed June 13, 1955, Ser. No. 515,220

6 Claims. (Cl. 260—295)

The present invention relates to the synthesis of long chain fatty acid derivatives of vitamin B$_6$, and the use of the same.

It is known that vitamin B$_6$ is one of the essential micronutrients, and is one of the members of water soluble vitamins. In accordance with our present invention, we have found that any form of vitamin B$_6$, i.e., pyridoxine, pyridoxal, and pyridoxamine, etc., can be esterified completely or partially with saturated and/or unsaturated long chain fatty acids, such as caproic, caprylic, capric, lauric, myristic, palmitic, stearic, oleic, linoleic, linolenic, and other long chain fatty acids. The esterification procedure is mainly based on the reaction between any of the vitamin B$_6$ and the respective fatty acid halides with the aid of acid-binding agents. The acyl derivatives of vitamin B$_6$ thus obtained possess valuable and unique properties. The derivatives are soluble in fats and organic solvents; the vitamin B$_6$ efficiency is not diminished by the esterification; the biological availability of the vitamin fragment is not diminished by the esterification; heat stability of the vitamin and the oil in which it is dissolved is profoundly improved; and the derivatives induce a higher deposition and a longer retention of the vitamin in the body when applied to animals. Thus, our present invention makes proper use of vitamin B$_6$ possible in nutritional, medical and therapeutic fields.

Like other water soluble vitamins, when vitamin B$_6$ is ingested, very rapid absorption and quick excretion results. When a newly invented long chain fatty acid ester of vitamin B$_6$, such as pyridoxine trilinoleate, is ingested, very rapid absorption also takes place; the excretion of the vitamin, however, occurs very slowly, so that a higher level of vitamin B$_6$ is maintained in the body for a longer period of time. When vitamin B$_6$ is subjected to heating for cooking or sterilization purposes, destructive or polymeric changes in the vitamin take place so as to diminish or to lose its activity. If the vitamin is esterified completely or partially with a single or a mixture of long chain fatty acids, the vitamin becomes more stable toward heat. This kind of property cannot be observed in the short chain fatty acid esters of vitamin B$_6$, such as pyridoxine triacetate. No loss of vitamin B$_6$ activity was observed when the vitamin was esterified with a long chain fatty acid, such as palmitic acid, and was heated to 205–210° C. for eight hours in a frying oil. This temperature is considered to be the maximum of the ordinary cooking or frying oil. When a long chain fatty acid ester of vitamin B$_6$, such as pyridoxine trilinoleate, was autoclaved under rather severe conditions, namely at twenty pound pressure for one hour in aqueous or 0.1 N hydrochloric acid medium, no sign of hydrolysis of the ester linkage and no destruction of the compound was noted. The derivatives can, therefore, be sterilized without any specific precautions.

Some of the methods for producing the new substances outlined above will be described, but it is to be understood that these examples will be given by way of illustration and not of limitation, as follows:

*Example 1*

One gram of pyridoxine hydrochloride, which was dried over concentrated sulfuric acid in a desiccator for 24 hours, was suspended in a mixture of 25 ml. dried pyridine and 10 ml. of alcohol-free chloroform. This suspension was cooled with an ice-water bath and 25 ml. chloroform which contained 8.5 g. (excess) of palmitoyl chloride was added dropwise with stirring. While the reaction proceeded, the particles of pyridoxine hydrochloride disappeared and finally a clear solution was obtained. After addition of the palmitoyl chloride, the ice-water bath was removed and stirring at room temperature was continued for a few hours. The solvent was then removed at room temperature under vacuum and the residue was extracted with ether. The ether extract was washed with 0.5 N cold sulfuric acid and with water until neutral to pH test paper. This ether solution was then diluted with an equal amount of 95% ethyl alcohol and the excess of palmitic acid present in the mixture was neutralized to phenolphthalein with alcoholic potassium hydroxide and washed out with water. The ether extract was dried over anhydrous sodium sulfate and the ether removed at low temperature under diminished pressure. The residue, pyriodoxine tripalmitate, was recrystallized from absolute ethyl alcohol. White somewhat fatty powder. M.P. 72–74° C.

*Example 2*

Pyridoxal dipalmitate was prepared from 200 mg. pyridoxal hydrochloride and 2 g. palmitoyl chloride in a similar manner to that described for Example 1. White fatty powder. M.P. 74° C.

*Example 3*

Pyridoxamine tripalmitate was prepared from 200 mg. pyridoxamine dihydrochloride and 2 g. palmitoyl chloride in a similar manner to that described for Example 1. White fatty powder. M.P. 102–103° C.

*Example 4*

Pyridoxine trilinoleate was prepared from 1 g. pyridoxine hydrochloride and 8.5 g. linoleoyl chloride in a similar manner to that described for Example 1. The crude product was dissolved in hot ethyl alcohol, and cooled, so that the trilinoleate separated out as fine droplets. The mixture was centrifuged and the bottom layer collected. Pyridoxine trilinoleate was thus purified. Oily liquid even at −20° C.

*Example 5*

Three hundred mg. of monoethylacetal of pyridoxal hydrochloride was treated with 500 mg. palmitoyl chloride in a manner similar to that described for Example 1. The crude product was gently refluxed in 60% ethyl alcohol containing 12% hydrogen chloride for 20 minutes. Upon cooling the solution, a white precipitate separated, which was recrystallized from 60% ethyl alcohol. The final compound was mainly pyridoxal monopalmitate. M.P. 48–51° C.

*Example 6*

Three hundred mg. of isopropylidenepyridoxine hydrochloride and 500 mg. palmitoyl chloride were treated in a manner similar to that described for Example 1. The resulting compound was recrystallized from acetone-Skellysolve B in the presence of a small amount of dry hydrogen chloride. The white precipitate was isopropylidenepyridoxine monopalmitate hydrochloride, which melted at 132.5–133.5° C.

Example 7

Two hundred mg. of pyridoxal dipalmitate prepared in Example 2 was dissolved in 100 ml. of hot ethyl alcohol (95%) and refluxed for two hours in the presence of 20 g. zinc powder. After cooling, the reaction mixture was filtered, and the filtrate was concentrated to 10 ml. Pyridoxine dipalmitate crystallized upon cooling the concentrate. White fatty powder. M.P. 58–61° C.

Example 8

Heat stability of the various fatty acid esters of pyridoxine was tested as follows: one percent solution of the test compound in olive oil was heated in the oil bath at 205–210° C. for eight hours, and the degree of discoloration was recorded as an index of heat stability.

| Compound | Discoloration |
| --- | --- |
| Pyridoxine Triacetate | Severe carbonization. Black mass separated. |
| Pyridoxine Trihexanoate | Dark red. |
| Pyridoxine Trioctanoate | Very light amber. |
| Pyridoxine Tridecanoate | No discoloration. |
| Pyridoxine Tripalmitate | No discoloration. |
| Isopropylidenepyridoxine monopalmitate.HCl. | Light amber. |

We claim:
1. A long chain fatty acid ester of Vitamin $B_6$ wherein the fatty acid group is derived from a carboxylic acid containing from eight to twenty carbon atoms.
2. Pyridoxine tripalmitate.
3. Pyridoxal dipalmitate.
4. Pyridoxamine tripalmitate.
5. Pyridoxine trilinoleate.
6. Pyridoxal monopalmitate.

References Cited in the file of this patent

UNITED STATES PATENTS

| | | |
| --- | --- | --- |
| 2,296,167 | Kuhn et al. | Sept. 15, 1942 |
| 2,349,267 | Harris et al. | May 23, 1944 |
| 2,417,841 | Ruskin | Mar. 25, 1947 |

OTHER REFERENCES

Harris et al.: Vitamins and Hormones, vol. VIII (1950), pp. 55–66, Academic Press Inc., New York.